United States Patent
Kim et al.

(10) Patent No.: US 7,477,620 B2
(45) Date of Patent: Jan. 13, 2009

(54) MANAGING NETWORK INFORMATION IN ACCESS ROUTERS (ARS)

(75) Inventors: Kil-Lyeon Kim, Suwon-si (KR); Byung-Gu Choe, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 483 days.

(21) Appl. No.: 11/035,892

(22) Filed: Jan. 18, 2005

(65) Prior Publication Data

US 2005/0180355 A1     Aug. 18, 2005

(30) Foreign Application Priority Data

Feb. 16, 2004    (KR) .................. 10-2004-0010157

(51) Int. Cl.
*H04Q 7/00*       (2006.01)
*H04Q 7/20*       (2006.01)

(52) U.S. Cl. ...................... 370/328; 455/436
(58) Field of Classification Search ............ 370/310, 370/342, 344, 352, 400; 455/436, 437, 456.1
See application file for complete search history.

(56) References Cited

U.S. PATENT DOCUMENTS

| | | | | |
|---|---|---|---|---|
| 5,835,710 | A | * | 11/1998 | Nagami et al. ............... 709/250 |
| 6,119,005 | A | * | 9/2000 | Smolik ........................ 455/436 |
| 7,187,931 | B2 | * | 3/2007 | Trossen ...................... 455/440 |
| 7,313,628 | B2 | * | 12/2007 | Chaskar et al. ............. 709/238 |
| 2002/0052964 | A1 | | 5/2002 | Ferner et al. |
| 2003/0046413 | A1 | | 3/2003 | Sakakura |
| 2003/0087646 | A1 | * | 5/2003 | Funato et al. ................ 455/456 |
| 2003/0091011 | A1 | * | 5/2003 | Roberts et al. .............. 370/338 |
| 2003/0091021 | A1 | | 5/2003 | Trossen et al. |
| 2003/0174667 | A1 | | 9/2003 | Krishnamurthi et al. |
| 2003/0179703 | A1 | | 9/2003 | Levy et al. |

(Continued)

FOREIGN PATENT DOCUMENTS

EP     1343277 A2     9/2003

(Continued)

OTHER PUBLICATIONS

*European Search Report* issued by the European Patent Office in applicant's corresponding European Patent Application No. EP 05003073.3.

(Continued)

*Primary Examiner*—Lester Kincaid
*Assistant Examiner*—Nathan Mitchell
(74) *Attorney, Agent, or Firm*—Robert E. Bushnell, Esq.

(57) ABSTRACT

Managing network information in Access Routers (ARs) includes: communicating with neighboring Access Routers (ARs) to obtain information of each of the ARs and Access Points (APs) belonging to a subnet of a relevant AR; storing the information of the ARs and APs in a database; and performing a communication network service in accordance with the information stored in the database. Desired information can be shared without a need for adding any separate element to the network architecture. In addition, because a Candidate Access Router (CAR) table is generated during the operation of the Open Shortest Path First (OSPF), the AR immediately responds to the information requested by a mobile node so as not to increase a handoff delay and so as to reduce a burden of the mobile node.

28 Claims, 8 Drawing Sheets

U.S. PATENT DOCUMENTS

| | | | |
|---|---|---|---|
| 2003/0220111 A1 | 11/2003 | Kang | |
| 2003/0223422 A1 | 12/2003 | Igarashi et al. | |
| 2003/0227911 A1 | 12/2003 | Trossen | |
| 2004/0004967 A1 | 1/2004 | Nakatsugawa et al. | |
| 2004/0005894 A1* | 1/2004 | Trossen et al. | 455/436 |
| 2004/0022258 A1 | 2/2004 | Tsukada et al. | |
| 2004/0023653 A1 | 2/2004 | O'Neill | |
| 2004/0092264 A1 | 5/2004 | Koodli et al. | |
| 2004/0114558 A1 | 6/2004 | Krishnamurthi et al. | |
| 2004/0137888 A1 | 7/2004 | Ohki | |
| 2004/0139224 A1 | 7/2004 | Nishimura et al. | |
| 2004/0166857 A1* | 8/2004 | Shim et al. | 455/436 |
| 2005/0021946 A1* | 1/2005 | Narayanan | 713/163 |
| 2005/0163080 A1* | 7/2005 | Suh et al. | 370/331 |
| 2005/0201380 A1* | 9/2005 | Saleh et al. | 370/395.2 |

FOREIGN PATENT DOCUMENTS

| | | |
|---|---|---|
| JP | 2003-188894 | 7/2003 |

OTHER PUBLICATIONS

Eunsoo Shim, Jens-Peter Redlich, Richard D. Gitlin: "Secure Candidate Access Router Discovery", WCNC 2003, 'Online! vol. 4, No. 1, Mar. 16, 2003.

Marco Liebsch et al.: "Candidate Access Router Discovery", Draft-Ietf-Seamoby-Card-Protocol-03. TXT, Aug. 2003.

Dirk Trossen et al.: "A Dynamic Protocol for Candidate Access-Router Discovery" Draft-Trossen-Seamoby-Dycard-01.TXT, Mar. 14, 2003.

J. Loughney et al.: "Context Transfer Protocol" Draft-Ietf-Seamoby-CTP-03.TXT, Jun. 2003.

Japanese Office Action corresponding to Japanese Patent Application No. 2005-025848, issued on Oct. 30, 2007.

Document by Eunsoo Shim, Jens-Peter Redlich, and Richard D. Gitlin, entitled *Secure Candidate Access Router Discovery*, WCNC 2003, pp. 1819-1824, published on Mar. 16, 2003.

* cited by examiner

| L2 ID | L2 Type | AR IP | Prefix Length | Timeout | Capability Table Pointer |
|---|---|---|---|---|---|
| 00aabbccddee | WLAN | 3ffe:2e01::1 | 64 | 7200 | Null |
| 00aabbccddff | WLAN | 3ffe:2e02::1 | 64 | 7200 | Null |

MANAGING NETWORK INFORMATION IN ACCESS ROUTERS (ARS)

CLAIM OF PRIORITY

This application makes reference to, incorporates the same herein, and claims all benefits accruing under 35 U.S.C. §119 from an application for METHOD FOR MANAGING NETWORK INFORMATION IN ACCESS ROUTERS AND THE SAME earlier filed in the Korean Intellectual Property Office on 16 Feb. 2004 and there duly assigned Serial No. 2004-10157.

BACKGROUND OF THE INVENTION

1. Field of the Invention

The present invention relates to managing network information in Access Routers (ARs).

2. Description of the Related Art

Recently, with the rapid popularization of wireless communication and the Internet, the desire of users to use a high quality of Internet service irrespective of time and place has increased rapidly. Furthermore, with improved performance of mobile nodes, such as portable computers or Personal Digital Assistants (PDAs), and advanced wireless communication technologies, the number of users has significantly increased.

Adopting a specific identifier called an Internet Protocol (IP) address in mobile nodes enables users to be successively provided with a service independently used by the users in a link layer, as well as a global roaming problem to be addressed. In this regard, deployment of mobile IPs and a task for standardizing suitable protocols to overcome its shortcoming are under way by the mobileip working group (which is currently divided by mip4 and mip6) in the Internet Engineering Task Force (IETF).

Meanwhile, an explosive increase in the number of Internet users is causing the exhaustion of existing IPv4 Internet addresses. To solve this problem, IPv6 which is a next generation Internet protocol attracts attention. Studies have been performed actively to provide mobility by using IPv6. A mobile IPv6 (hereinafter, referred to as MIPv6) technique of the IETF will be brought into use as a standard technique for a method of supporting user's mobility at a later point in time when the IP protocol for the Internet gets changed to IPv6. The current MIPv6 has been revised to the IETF Internet-Draft version 24 since it was initially proposed in 1996. The MIPv6 status is going to be a Request For Comments (RFC).

In the MIPv6 standard, as a protocol for minimizing a handoff delay and a packet loss when a Mobile Node (MN) moves into a new network, "Fast Handovers for Mobile IPv6" (hereinafter, referred to as FMIPv6, draft-ietf-mobileip-fast-mipv6-07.txt) has been proposed by the IETF mobile ip working group, which is going to be converted into an RFC.

In the FMIPv6, it is assumed that all Access Routers (ARs) have a Candidate Access Router Discovery (CARD) function and that the ARs obtain information of neighboring routers using a function provided by a separate CARD server or terminal.

In the FMIPv6, it is also assumed that the AR has a CARD function. Basic functions of the CARD protocol required herein are as follows:

Reverse address translation: a function of mapping the L2 ID of an AP to an IP address of the AR to which this AP belongs. The MN receives a beacon signal to perform handoff, and this signal includes the L2 ID of the AP. By sending the L2 ID to the current AR, the mobile node requests an IP address of an AR in a new region into which the MN will move. Through such processes, a series of tasks for reducing the handoff delay take place.

Discovery of Current Access Router (CAR) capabilities: in order to perform optimal handoffs, a CAR provides information on allowing an MN to select a suitable CAR by providing information on the CAR to the MN. Information on the IP service, which will be provided, includes services in which the MN may be interested in upon selecting the CAR, for example, seamless handoff support, security functions, wireless performance enhancing functions, administrative and business aspects of providing service to the MN (service provider, cost of access, etc.), availability of certain type of resources with the AR (QoS), etc. The CARD protocol must provide a function of exchanging capability information on the AR.

The following patents each discloses features in common with the present invention but do not teach or suggest the inventive features specifically recited in the present claims: U.S. Patent Application No. 2003/0227911 to Trossen, entitled CANDIDATE ACCESS ROUTER DISCOVERY, issued on 11 Dec. 2003; U.S. Patent Application No. 2003/0223422 to Igarashi et al., entitled PACKET TRANSMISSION METHOD AND COMMUNICATION SYSTEM, issued on Dec. 4, 2003; U.S. Patent Application No. 2003/0220111 to Kang, entitled DSL MOBILE ACCESS ROUTER SYSTEM AND METHOD, issued on Nov. 27, 2003; U.S. Patent Application No. 2003/0179703 to Levy et al., entitled AUTOMATIC ROUTER CONFIGURATION BASED ON TRAFFIC AND SERVICE LEVEL AGREEMENTS, issued on 25 Sep. 2003; U.S. Patent Application No. 2003/0174667 to Krishnamurthi et al., entitled METHOD AND APPARATUS FOR ALERTING MOBILE NODES OF DESIRABLE ACCESS CHARACTERISTICS, issued on Sep. 18, 2003; U.S. Patent Application No. 2003/0091021 to Trossen et al., entitled PHYSICALLY SCOPED MULTICAST IN MULTI-ACCESS NETWORKS, issued on May 15, 2003; U.S. Patent Application No. 2003/0046413 to Sakakura, entitled NETWORK SYSTEM DYNAMICALLY MADE FOR A SHORT-DISTANCE WIRELESS COMMUNICATION AND NETWORK STRUCTURING METHOD, issued on Mar. 6, 2003; U.S. Patent Application No. 2002/0052964 to Ferner et al., entitled METHOD AND DEVICE FOR DATA COMMUNICATION, issued on May 2, 2002; U.S. Patent Application No. 2004/0114558 to Krishnamurthi et al., entitled END-TO-END LOCATION PRIVACY IN TELECOMMUNICATIONS NETWORKS, issued on Jun. 17, 2004; U.S. Patent Application No. 2004/0092264 to Koodli et al., entitled SYSTEM AND METHOD FOR DISCOVERING NETWORK INTERFACE CAPABILITIES, issued on May 13, 2004; U.S. Patent Application No. 2004/0023653 to O'Neill, entitled CONTROLLING HAND-OFF IN A MOBILE NODE WITH TWO MOBILE IP CLIENTS, issued on Feb. 5, 2004; U.S. Patent Application No. 2004/0004967 to Nakatsugawa et al., entitled MOBILE COMMUNICATION SYSTEM, ROUTER, MOBILE NODE, AND MOBILE COMMUNICATION METHOD, issued on Jan. 8, 2004; U.S. Patent Application No. 2004/0022258 to Tsukada et al., entitled SYSTEM FOR PROVIDING ACCESS CONTROL PLATFORM SERVICE FOR PRIVATE NETWORKS, issued on 5 Feb. 2004; U.S. Patent Application No. 2004/0139224 to Nishimura et al., entitled MOBILE COMMUNICATION SYSTEM, SERVER APPARATUS, AND DATA TRANSMISSION METHOD, issued on Jul. 15, 2004; and U.S. Patent Application No. 2004/0137888 to Ohki, entitled SYSTEM FOR MANAGING MOBILE NODE IN MOBILE NETWORK, issued on Jul. 15, 2004.

SUMMARY OF THE INVENTION

The present invention is conceived to solve the aforementioned conventional problems, and it is an object of the present invention to provide a method for managing network information in ARs, and such ARs, in which mapping information is exchanged and synchronized by virtue of an AR's function instead of using a separate CARD server.

According to an aspect of the present invention, a method is provided for managing network information in ARs, the method comprising: communicating with neighboring Access Routers (ARs) to obtain information of each of the ARs and Access Points (APs) belonging to a subnet of a relevant AR; storing the information of the ARs and APs in a database; and performing a communication network service in accordance with the information stored in the database.

According to another aspect of the present invention, an AR is provided comprising: a memory adapted to store programs and databases; and a processor adapted to access one of the programs stored in the memory to obtain information of each of the ARs and AP belonging to a subnet of a relevant AR via communication with neighboring ARs, to store the information of the ARs and APs as a database in the memory, and to perform a communication network service in accordance with the information stored in the database.

According to yet another aspect of the present invention, a program storage device, readable by a machine, tangibly embodying a program of instructions executable by the machine is provided to perform a method comprising: communicating with neighboring Access Routers (ARs) to obtain information of each of the ARs and Access Points (APs) belonging to a subnet of a relevant AR; storing the information of the ARs and APs in a database; and performing a communication network service in accordance with the information stored in the database.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A central server is primarily used to exchange and maintain address-mapping information between ARs.

Figure 1:
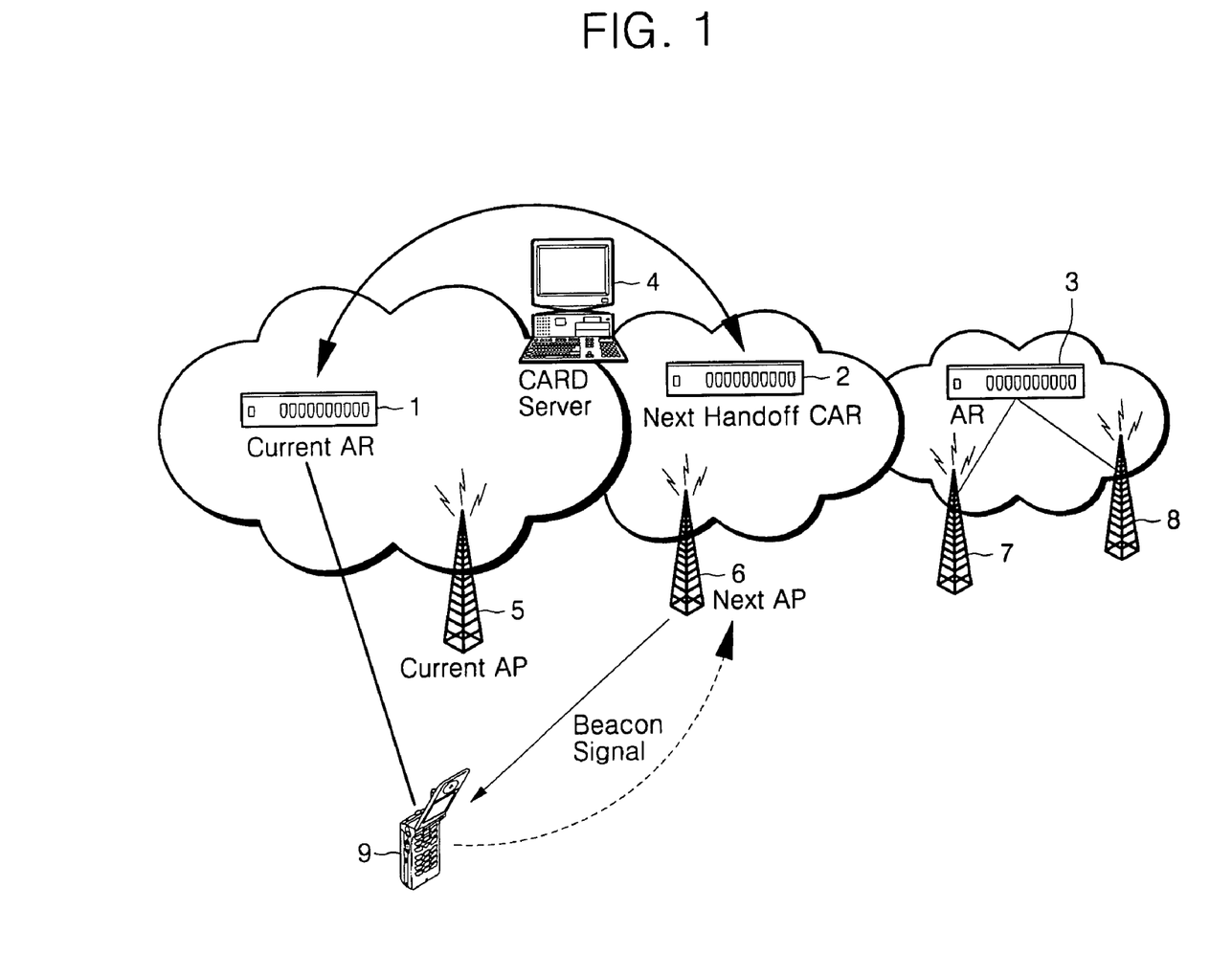
FIG. 1 is a view of a system that performs an information exchange between ARs using a central server.

FIG. 1 is a view of a system that performs an information exchange between ARs using a central server.

Referring to FIG. 1, the system is composed of a number of ARs 1, 2 and 3, and a central server 4 for managing information on the ARs 1, 2 and 3. Each of the ARs 1, 2 and 3 manages APs 5, 6, 7 and 8 that provide a wireless service to a subscriber terminal 9.

The CARD server 4 provides a function of managing L2 IDs of the APs 6, 7 and 8 and IP mapping tables of the ARs 1, 2 and 3 in its management area and communicating with each of the ARs 1, 2 and 3.

The CARD server 4 manages the mapping tables in a centralized manner, and accordingly the current AR 1 will discover an IP address of the next CAR 2 with the aid of the CARD server 4. In the current FMIPv6, all of the ARs 1, 2 and 3 are forced to forward the L2 information of the Aps 5, 6, 7 and 8 managed by the ARs to the CARD server 4.

However, there is a problem in that because the CARD server 4 manages all information, the operation of the FMIPv6 is significantly affected upon a failure in the CARD server 4. Furthermore, there is a problem in that a handoff delay is additionally caused by the information exchange between the AR 1 and the CARD server 4, and such a delay becomes longer when a number of requests are made to the CARD server 4 at one instant.

Hereinafter, the present invention will be described in detail with reference to the accompanying drawings.

Figure 2:
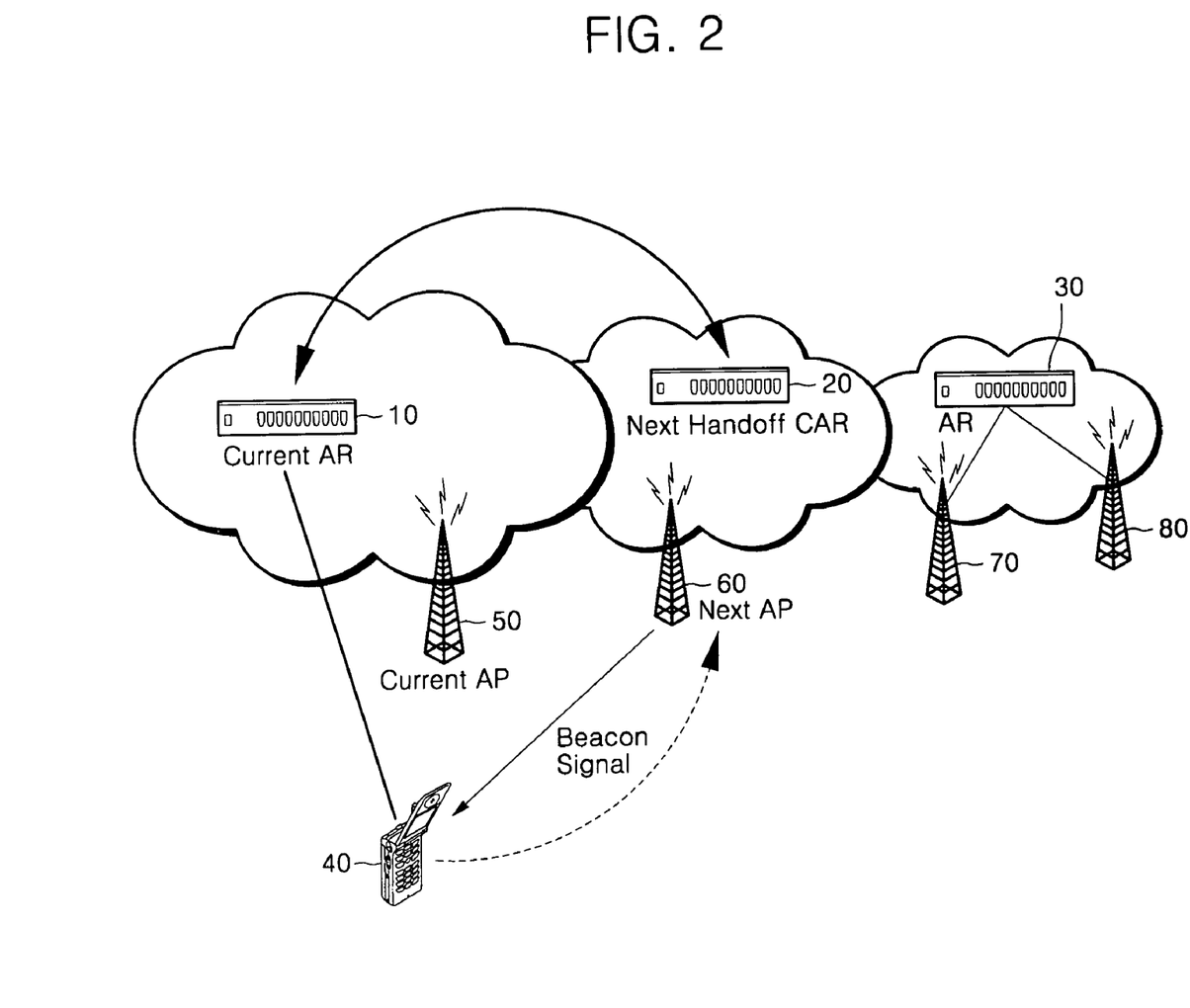
FIG. 2 is a view of a system that performs an information exchange between ARs according to an embodiment of the present invention.

FIG. 2 is a view of a system that performs an information exchange between ARs according to an embodiment of the present invention.

Referring to FIG. 2, a system according to the present invention includes a number of ARs 10, 20 and 30. Each of the ARs 10, 20 and 30 is managing APs 50, 60, 70 and 80 that provide a wireless service to a subscriber terminal 40.

Each of the ARs 10, 20 and 30 includes a memory for storing at least one program and database as well as a processor, wherein the processor executes the program stored in the memory, obtains information not only on each AR but also the APs belonging to a subnet of the relevant AR through the communication with neighboring ARs, stores the information on the routers and APs in the memory as the database, and performs a communication network service based on the database. The AR builds and synchronizes a CAR table for mapping an L2 ID of each of the APs 50, 60, 70 and 80 to an IP address of each of the ARs 10, 20 and 30.

The CAR table needed to implement FMIPv6 is realized through the expansion of an OSPF protocol, which operates in a typical AR.

The Open Shortest Path First (OSPF) has a new function to solve the difficulty of a Routing Information Protocol (RIP). The OSPF is a protocol that supports the routing in the shortest path by combining distance information between nodes and link state information to routing information in real time so that a user selects the shortest path on the Internet network.

The OSPF is used to share routing information between intra domain routers and synchronizes the routing table. It is basically similar to generating the CAR table and further provides, by expanding the OSPF, an exchange of the mapping information for generating the CAR table as well as the routing information.

The current AR 10 and the next handoff CAR 20 generate the CAR table by exchanging necessary information therebetween in advance.

Figure 3:
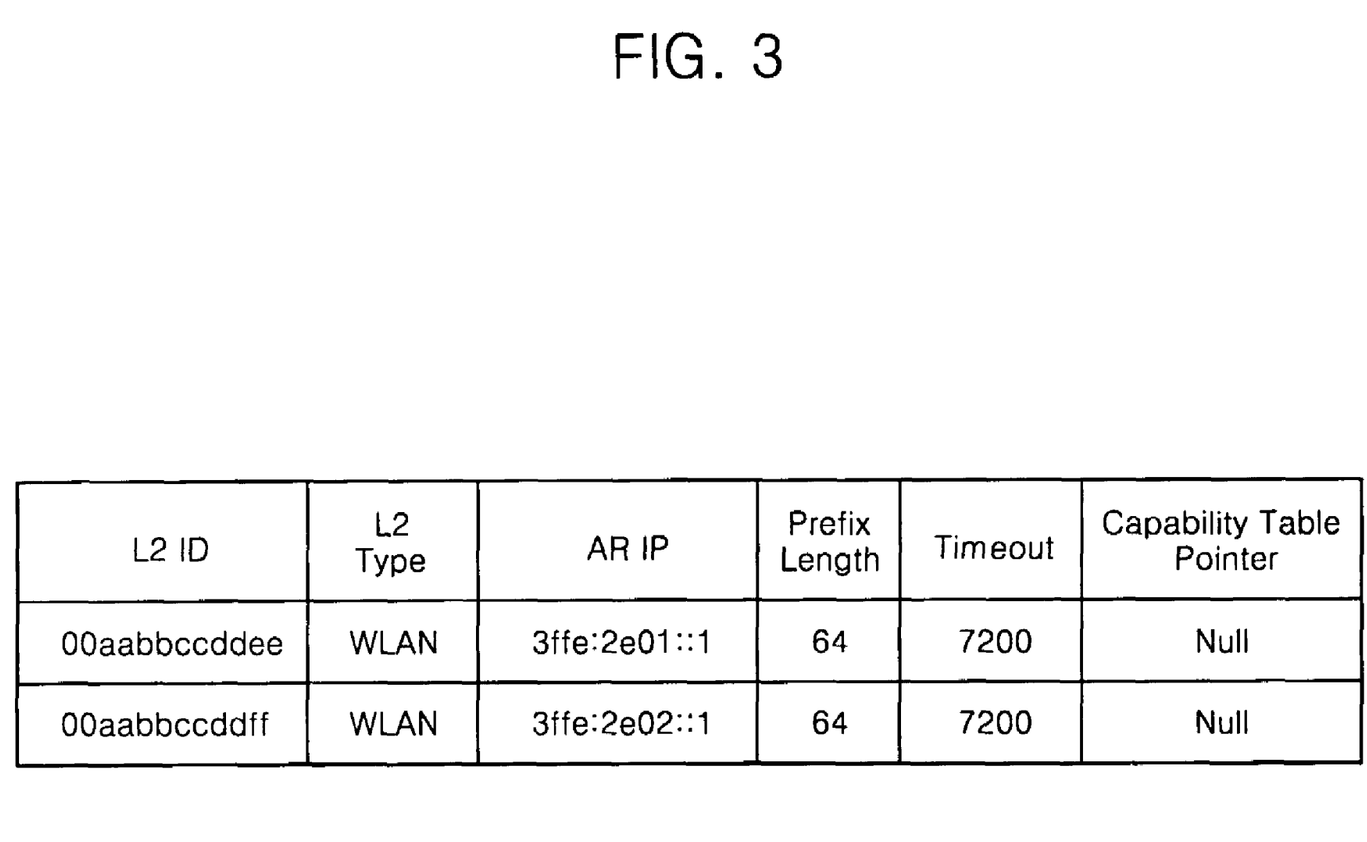
FIG. 3 is a CAR table according to an embodiment of the present invention.

FIG. 3 is a view of the contents of the CAR table.

Referring to FIG. 3, the CAR table generated in each AR is organized to have the following contents:

L2 ID is an identifier of the AP on the subnet of the router. It is changed according to the type of wireless link. When the link is a wireless LAN, the L2 ID becomes a MAC address of the AP.

L2 Type is the type of a wireless link to which the AP belongs.

AR IP is an IPv6 address of an AR of a subnet to which an AP belongs.

Prefix Length indicates the length of a prefix in an AR address.

Timeout indicates an effective time period of this entry.

Capability Table Pointer is an extension field for supporting other services later.

In the present invention, the function of the OSPF is expanded to exchange the CAR table while maintaining existing functions of an OSPF protocol as is. The expanded content is as follows:

First, a hello packet of the OSPF packets is employed.

The hello packet is used to discover the modified configuration of the network and to select a designated router and a backup designated router. The hello packet indicates whether the FMIPV6 is supported, as an option.

Figure 4:
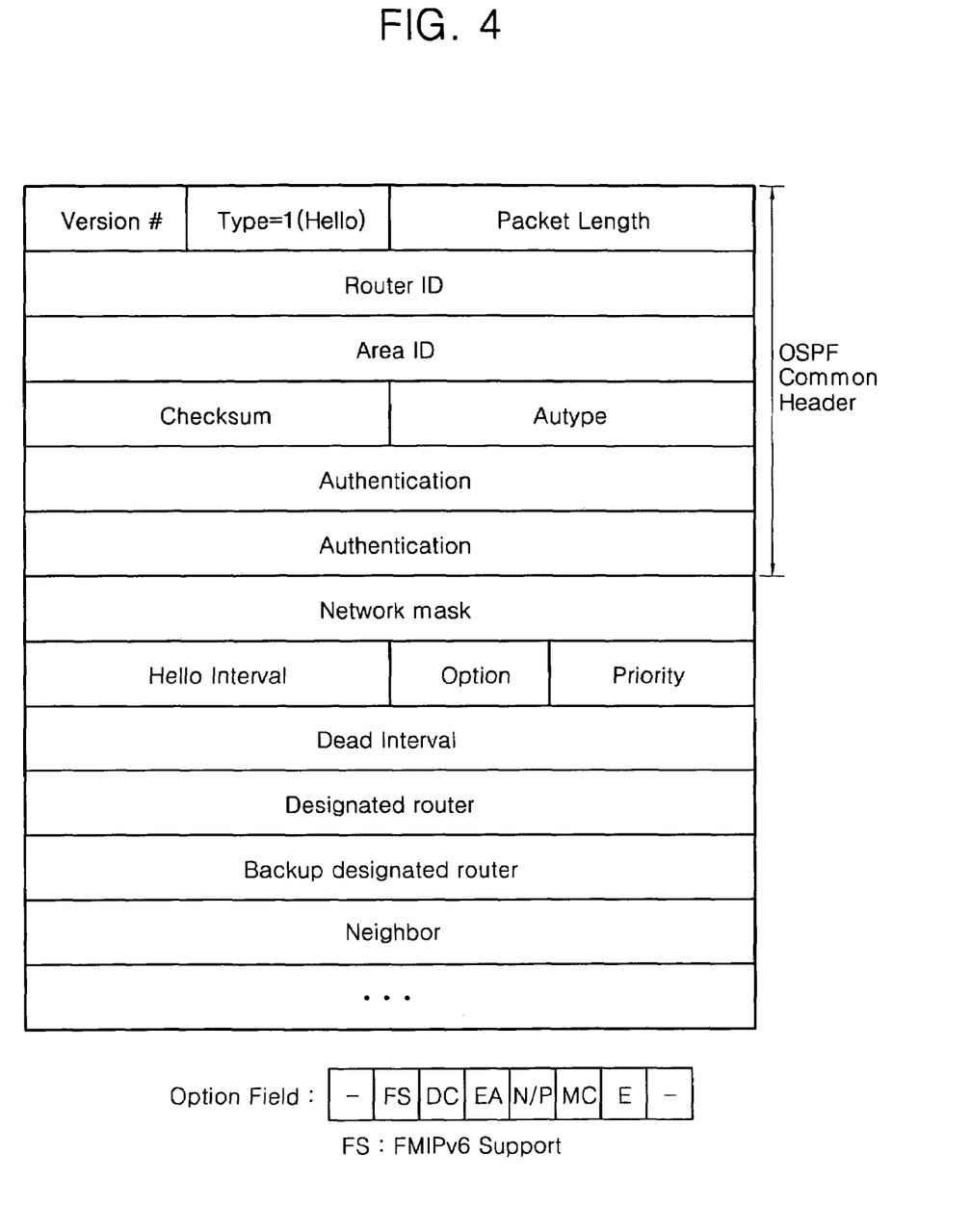
FIG. 4 is a view of a format of a hello packet according to an embodiment of the present invention.

FIG. 4 is a view of a format of a hello packet transmitted and received between respective ARs expanded for the purpose of the exchange function of the CAR table. The expanded content indicates whether or not the relevant router supports the FMIPv6 by adding an FS (FMIPv6 support) bit to an option field of a packet header.

Two types of new OSPF packets are defined. That is, Type=6 is defined to cause the function of the CAR table description packet (CAR-D) to be performed.

Figure 5:
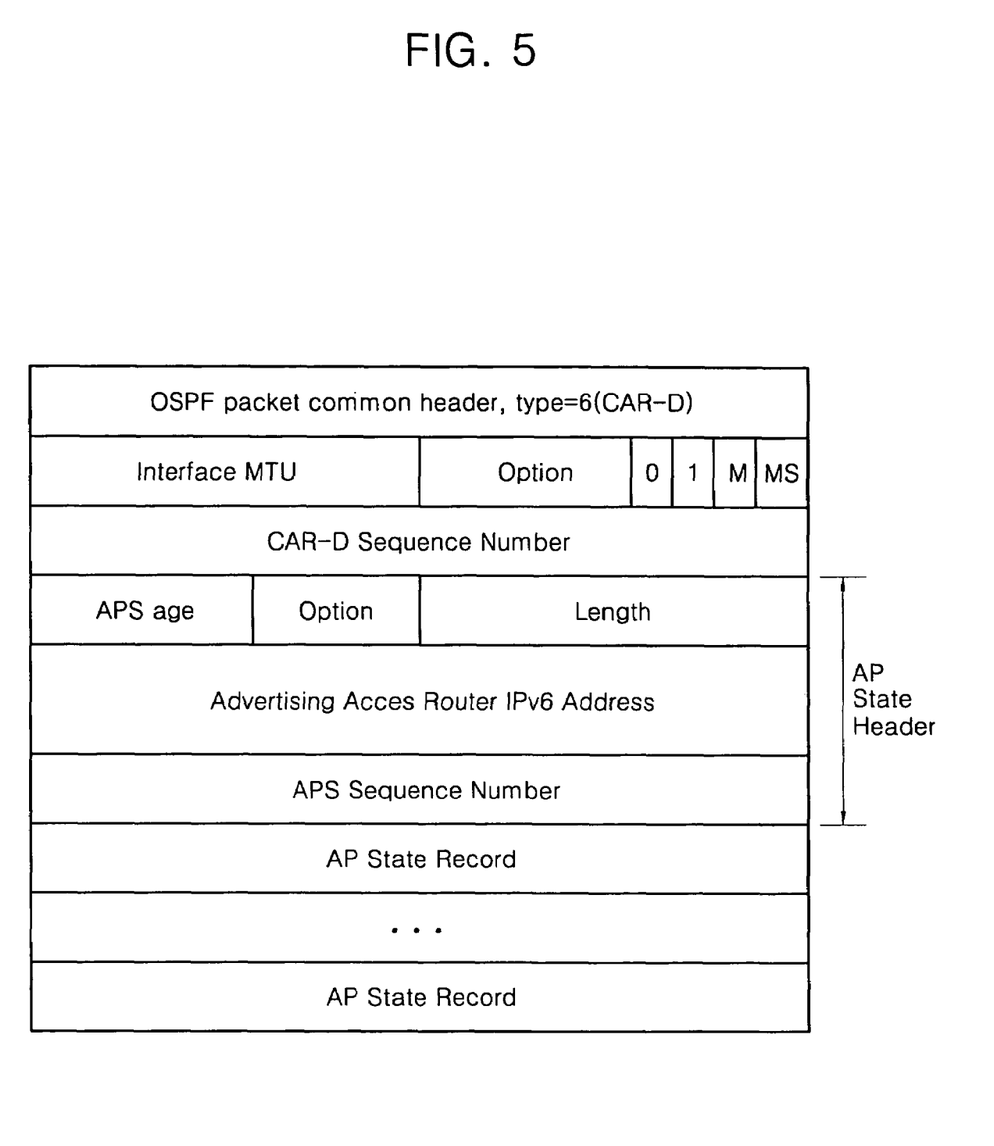
FIG. 5 is a view of a format of a CAR-D packet according to an embodiment of the present invention.

FIG. 5 is a view of a format of the CAR-D packet. As shown, it is similar to a type 2 (database description) packet of an existing OSPF.

Referring to FIG. 5, a newly defined CAR-D packet is composed of an OSPF packet common header having a type field value of 6, a field needed for the CAR-D information exchange, an AP state common header, and an AP state record.

Referring to FIG. 4, the OSPF packet common header is shown. The field needed for exchanging the CAR-D information includes a CAR-D sequence number field. This field is used to synchronize the information exchange between ARs.

The AP state common header, as shown in FIG. 5, is composed of AP State (APS) age, options, a length, an advertising AR IPv6 address, an APS sequence number, and the like, and is similar to the link state header of the existing OSPF.

Figure 6:
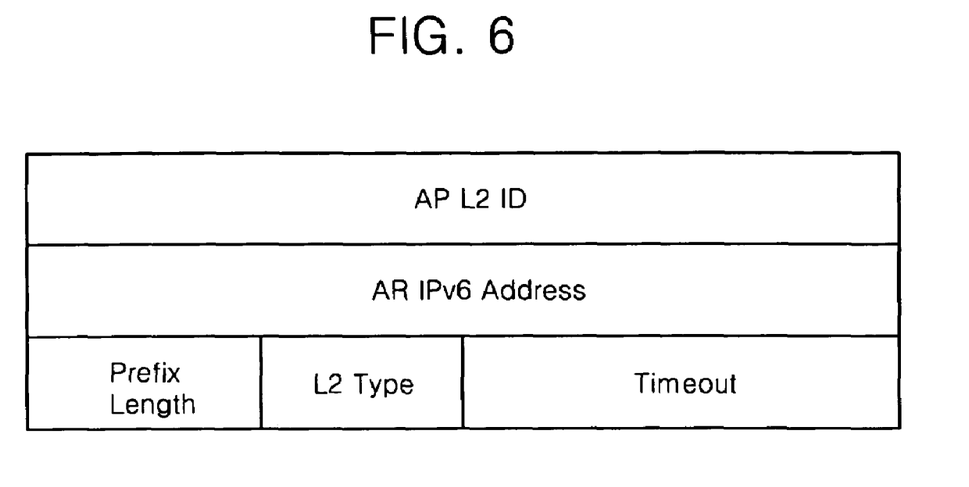
FIG. 6 is a view of details of "AP State Record" shown in FIG. 5.

FIG. 6 is a view of the contents of "AP State Record." This "Record" includes an L2 ID of each AP, an IPv6 address of the AR to which a relevant AP belongs, a "Prefix Length" for auto-configuration, "an L2 Type", and a "Timeout" value indicating an effective time period of this "Record." When the subscriber terminal 40 knows the IPv6 address and prefix length information of the AR, the subscriber terminal 40 will automatically creates a Care-of Address (CoA), which will be used when moving into a next subnet.

Next, a packet for transmitting an acknowledgement signal is defined. That is, the type=7 denotes a packet for the acknowledgement signal, namely, a CAR table ack packet (CAR-ack).

Figure 7:
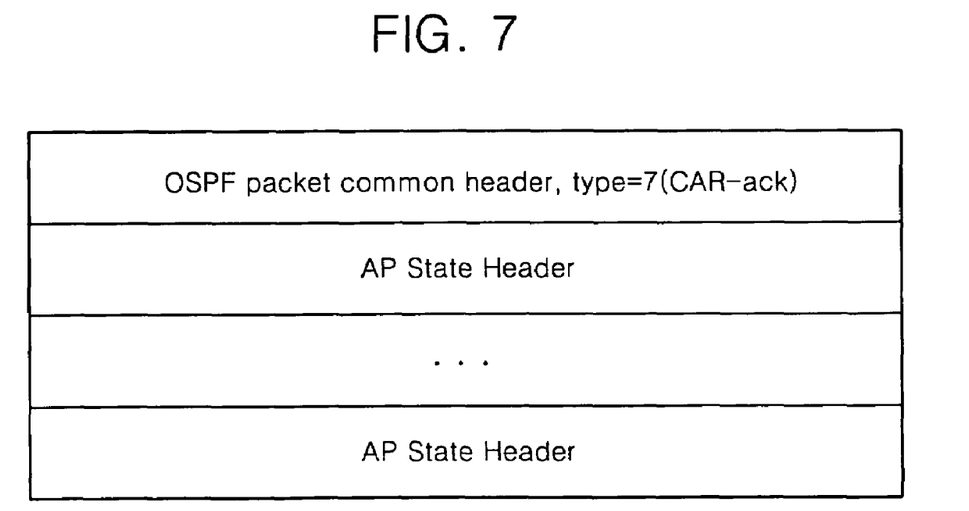
FIG. 7 is a view of a format of a CAR Table Ack packet according to an embodiment of the present invention.

FIG. 7 is a view of a format of a CAR-ack.

This packet is used as an acknowledgement relative to a CAR-D packet. That is, it informs an AR on the transmitting side that the CAR-D packet has been normally received. Furthermore, as shown in FIG. 7, this packet is capable of sending responses relative to several ASPs at one time, thus reducing the amount of traffic.

In the foregoing, the data format used to exchange and synchronize the CAR table between ARs using the OSPF has been described. This expanded OSPF will add a routine for processing the expanded packet while operating as in an existing in a manner distinguishable from the prior art FIG. 8 is a view of the type of a packet per each function of the OSPF used in an AR according to the present invention.

Figure 8:
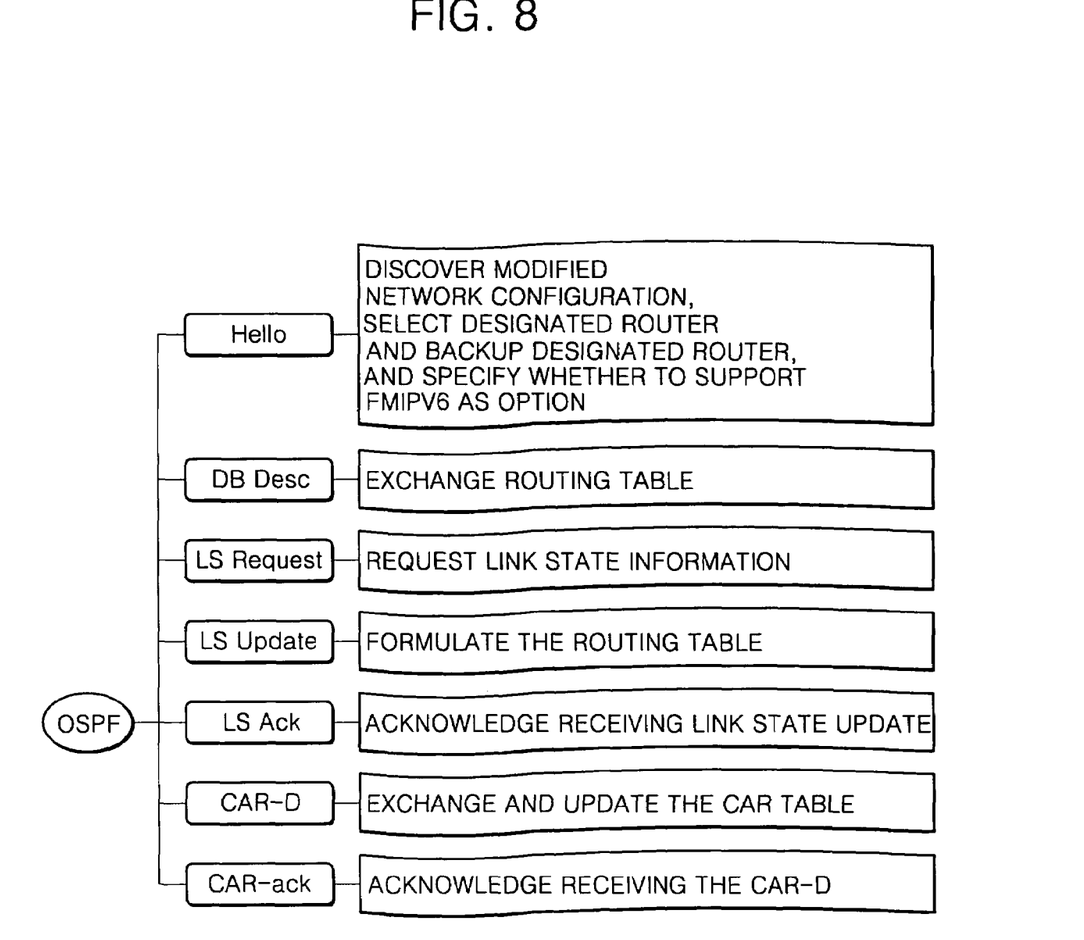
FIG. 8 is a view of a function of extended OSPF according to an embodiment of the present invention.

Referring to FIG. 8, the OSPF is composed of a hello packet (Hello), a packet (DB Desc) for exchanging a routing table, a packet (LS Request) for requesting link state information, a packet (LS Update) for formulating the routing table, a packet (LS Ack) for acknowledging the receipt of the link state update packet, a packet (CAR-D) for exchanging and updating the CAR table, and a packet (CAR-ack) for acknowledging the receipt of the CAR-D packet.

A process to generate and synchronize the CAR table using an expanding function of the OSPF according to the present invention is discussed below.

If the OSPF is driven in each of the ARs, a hello packet is sent to neighboring routers. Processing this packet conforms to a hello protocol defined in the OSPF standard. The expanded processing procedure determines if an FS bit, which has been expanded to generate the CAR table, has been set upon processing the hello packet. If the FS bit has been set, a CAR table exchange routine is called.

The CAR tables are exchanged according to a DD exchange mechanism of the OSPF. The content of the CAR table is put into the expanded and defined CAR-D packet to be sent. The receiving side sends a CAR-ack as a response relative to receiving the CAR table.

In the present invention, the CAR-D and the CAR-ack are employed instead of defining a packet for updating the CAR table. If information on any AP in the same subnet in a particular AR is changed, namely, a new AP is added or an AP is down, only modified information on the AP is put into the CAR-D packet and sent. For the eliminated AP, by sending the AP state record in which the timeout field has a value of 0, the receiving side deletes the relevant AP from the CAR table.

Figure 9:
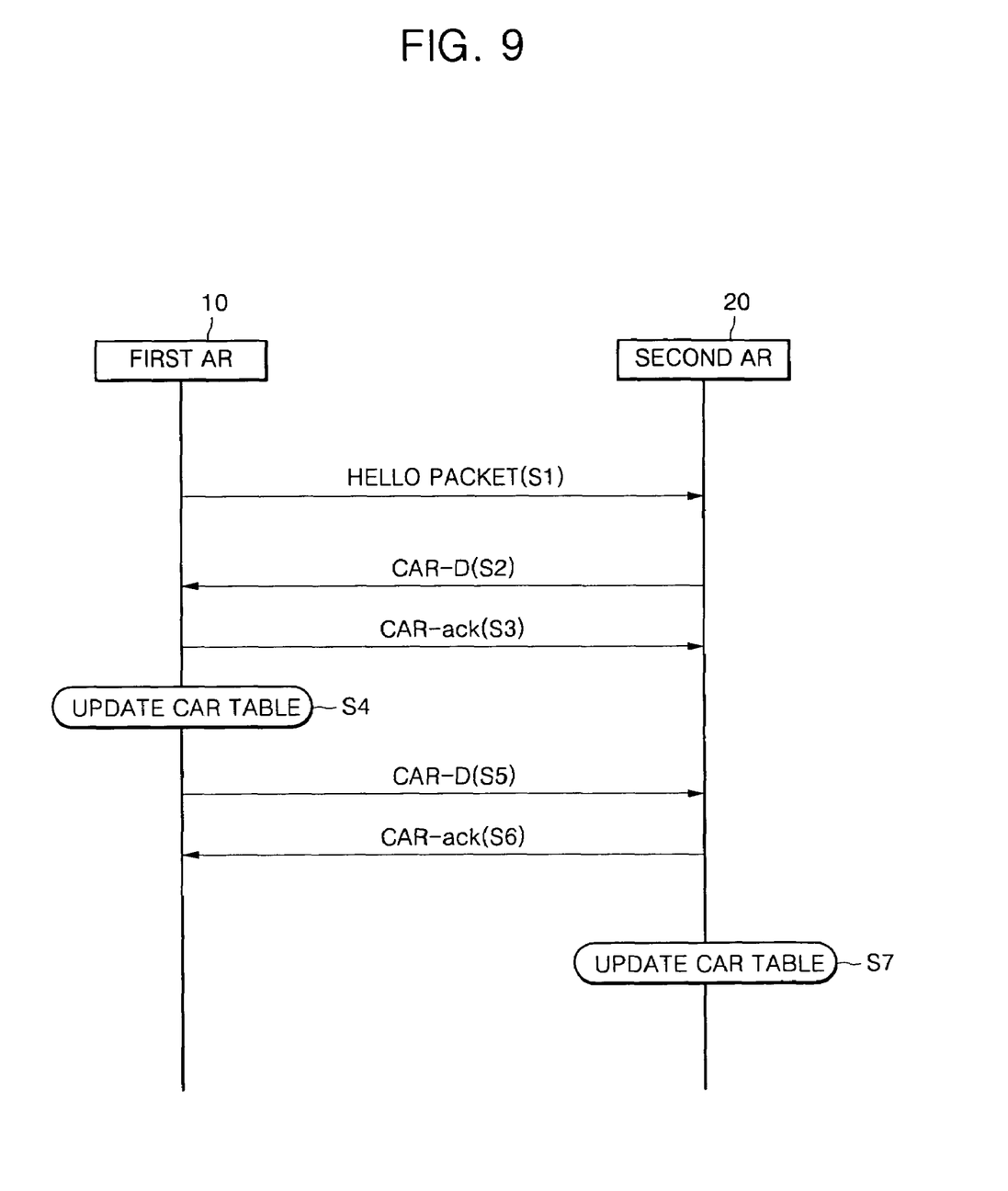
FIG. 9 is a view of a method for managing information in an AR according to an embodiment of the present invention.

FIG. 9 is a view of a method of managing network information in ARs according to an embodiment of the present invention.

A case in which a first AR 10 exchanges a CAR table by communicating with a second AR 20 of neighboring ARs will be discussed by way of example with reference to FIG. 9.

First, the first AR 10 sets a value for performing an information exchange function to the FS bit in a hello packet and then transmits the hello packet for the information exchange to the second AR 20 (S1). In response thereto, the second AR 20 receives the hello packet transmitted from the first AR 10 and confirms that the bit for the information exchange has been set. Thereafter, the second AR 20 puts the CAR table stored in its database into the CAR-D packet and sends the resultant packet to the first AR 10 (S2). When receiving the CAR table transmitted from the second AR 20, the first AR 10 transmits a CAR-ack packet as a response signal to the second AR 20 (S3).

In addition, the first AR 10 compares the CAR table received from the second AR 20 with a CAR table stored in the first AR and updates different information with up-to-date information (S4). The first AR 10 puts the updated CAR table into the CAR-D packet and sends the resultant packet to the second AR 20 (S5).

When receiving the CAR table transmitted from the first AR 10, the second AR 20 sends a CAR-ack packet as a response signal to the first AR 10 (S6). In addition, the second AR 20 compares the CAR table stored in the second AR to the CAR table received from the first AR 10 and updates its CAR table with up-to-date information (S7).

A procedure in which an arbitrary subscriber terminal performs hand-over in a system in which the ARs exchange CAR tables therebetween in this manner is described below.

The subscriber terminal 40 receives a beacon signal from the first AP 50 while performing a communication service by being allocated wireless resources from the first AP 50 in the first AR 10. This beacon signal includes an L2 ID (MAC address) of the first AP.

If the subscriber terminal 40 receives the beacon signal transmitted from the first AP 50 and also enters a region where a beacon signal is received from the second AP 60 in the second AR 10, it receives the beacon signal from the second AP 60. The beacon signal received from the second AP 60 includes an L2 ID (MAC address) of the second AP 60.

The subscriber terminal 40 extracts the L2 ID (MAC address) of the second AP 60 from the beacon signal received from the second AP 60 and sends it to the first AP 50 which is communicating with the subscriber terminal 40. The first AP 50 sends the L2 ID (MAC address) of the second AP 60, received from the subscriber terminal 40, to the first upper AR 10.

The first AR 10 inquires the L2 ID (MAC address) of the second AP 60 in the CAR table stored in the first AR, and sends the network information of the second AP 60 stored in the CAR table to the first AP 50, the network information including the information of the second AR to which the second AP 60 belongs. The first AP 50 sends the network information of the second AP 60, received from the first AR 10, to the subscriber terminal 40.

The subscriber terminal 40 stores the network information of the second AP 60 received from the first AP 50 in the memory of the subscriber terminal. Then, when entering a region where a signal transmitted from the second AP 60 becomes stronger than a signal transmitted from the first AP 50, the subscriber terminal 40 is allocated a wireless resource from the second AP 60 to perform a communication service by performing the hand-over into a service region of the second AP 60 based on the network information of the second AP 60 stored in the subscriber terminal 40.

According to the present invention, the information of APs on the subnets of each AR can be exchanged between the ARs by expanding the function of the OSPF protocol without the aid of a separate CAR server. There is an advantage in that it is possible to share desired information without the need for adding any separate element to the network architecture because the OSPF is being extensively used in current networks. In addition, because a CAR table can be generated during the operation of the OSPF, the AR immediately responds to the information requested by the MN so as not to increase a handoff delay and so as to reduce a burden of the MN.

What is claimed is:

1. A method comprising:
   communicating with neighboring Access Routers (ARs) and exchanging mapping information of Candidate Access Router tables to obtain information of each of the neighboring ARs and Access Points (APs) belonging to a subnet of a relevant AR;
   storing the mapping information of the Candidate Access Router tables in a database; and
   performing a communication network service in accordance with the mapping information of Candidate Access Router tables stored in the database;
   wherein the communication network service comprises a hand-over service between the APs using the database,
   wherein exchanging the information comprises:
   transmitting a hello packet for an information exchange to the neighboring ARs;
   receiving first information of at least one AR and AP stored in a first AR from the first AR receiving the hello packet;
   transmitting stored second information of the at least one AR and AP to the first AR; and
   receiving a response signal relative to transmitting the information of the AR and AP from the first AR.

2. The method according to claim 1, wherein exchanging the information comprises:
   transmitting a hello packet for an information exchange to the neighboring ARs;
   receiving first information of at least one AR and AP stored in a first AR from the first AR receiving the hello packet;
   transmitting stored second information of the at least one AR and AP to the first AR; and
   receiving a response signal relative to transmitting the information of the AR and AP from the first AR.

3. The method according to claim 2, wherein the hello packet comprises a hello packet of the Open Shortest Path First (OSPF) protocol including a field requesting the information exchange.

4. The method according to claim 3, wherein the field comprises an option field in the hello packet of the OSPF protocol.

5. The method according to claim 1, wherein exchanging the information comprises transmitting the stored information of at least one AR and AP using an OSPF protocol.

6. The method according to claim 5, wherein the OSPF protocol comprises a first format of a packet, the packet including an OSPF packet common header, a sequence number, an AP state header, and an AP state record.

7. The method according to claim 6, wherein the AP state header comprises an effective time period of the packet, option information, a length, an address of a transmitting AR, and a sequence number.

8. The method according to claim 6, wherein the AP state record comprises at least one of an identifier of the AP, a service type of the AP, an identifier of the AR, a prefix length, and an effective time period.

9. The method according to claim 1, wherein a response signal relative to the received information of an AR and AP is transmitted using an OSPF protocol.

10. The method according to claim 9, wherein the OSPF protocol comprises a second format of a packet including an OSPE packet common header, and an AP state header per a transmitting AR.

11. The method according to claim 10, wherein the AP state header comprises an effective time period of a packet, option information, a length, an address of a transmitting AR, and a sequence number.

12. The method according to claim 2, wherein the first information comprises information of the first AR and AP in a subnet of the first AR.

13. The method according to claim 2, wherein the first information further comprises information of neighboring ARs other than the first AR and APs in subnets of the ARs.

14. The method according to claim 1, wherein exchanging the information comprises:
   receiving a hello packet for the information exchange from a first AR among the neighboring ARs that has transmitted the hello packet;

transmitting stored information of at least one AR and AP to the first AR;

receiving the information of at least one AR and AP stored in the first AR from the first AR; and transmitting a response signal relative to receiving the information of the AR and AP to the first AR.

15. The method according to claim 1, wherein the hand-over service comprises:

extracting information of a second AP from a beacon signal to transmit the extracted information to the first AP in response to a subscriber terminal communicating with a first AP receiving the beacon signal transmitted from the second AP;

the first AP requesting network information of the second AP from a database stored in its upper AR to transmit the requested network information to a subscriber terminal; and the subscriber terminal receiving and storing the network information of the second AP to perform a hand-over, and performing the hand-over in accordance with the stored network information of the second AP to communicate with the second AP in response to a signal transmitted from the second AP being stronger than a signal transmitted from the first AP.

16. The method according to claim 1, wherein the database comprises at least one of an identifier of the AP, a service type, an identifier of an AR, a prefix length, and an effective time period.

17. The method according to claim 16, wherein the identifier of the AP comprises a MAC address of the AP.

18. The method according to claim 16, wherein the identifier of the AR comprises an IP address of the AR.

19. The method according to claim 16, wherein the service type comprises a wireless LAN.

20. An Access Router (AR), comprising:

a memory storing programs and databases; and a processor accessing one of the programs stored in the memory to obtain mapping information of Candidate Access Router tables of each of the neighboring ARs and AP belonging to a subnet of a relevant AR via communication with neighboring ARs, storing the information of Candidate Access Router tables as a database in the memory, and performing a communication network service in accordance with the mapping information of Candidate Access Router tables stored in the database;

wherein the communication network service comprises a hand-over service between the APs using the synchronized databases, wherein the processor exchanges the database stored in the memory with the neighboring ARs using an Open Shortest Path First (OSPF) protocol.

21. The AR according to claim 20 wherein the OSPF protocol comprises a hello packet including a field requesting the information exchange.

22. The AR according to claim 20, wherein the processor transmits the stored information of at least one AR and AP using the OSPF protocol.

23. The AR according to claim 22, wherein the OSPF protocol comprises a first format of a packet including an OSPF packet common header, a sequence number, an AP state header, and an AP state record.

24. The AR according to claim 23, wherein the AP state header comprises an effective time period of the packet, option information, a length, an address of a transmitting AR, and a sequence number.

25. The AR according to claim 23, wherein the AP state record comprises at least one of an identifier of the AP, a service type of the AP, an identifier of the AR, a prefix length, and an effective time period.

26. The AR according to claim 20, wherein a response signal relative to the received information of the AR and AP is transmitted using the OSPF protocol.

27. The AR according to claim 26, wherein the OSPF protocol comprises a second format of a packet including an OSPF packet common header, and an AP state header per a transmitting AR.

28. The AR according to claim 27, wherein the AP state headers respectively comprise an effective time period of the packet, option information, a length, an address of a transmitting AR, and a sequence number.

* * * * *